United States Patent

[11] 3,581,878

[72] Inventor Bernhard E. Jacobson
   Cedar Falls, Iowa
[21] Appl. No. 822,556
[22] Filed May 7, 1969
[45] Patented June 1, 1971
[73] Assignee Universal Manufacturing Company
   Hudson, Iowa
   Continuation-in-part of application Ser. No. 706,349, Feb. 19, 1968.

[54] MATERIAL-HANDLING CONVEYOR MEANS
   6 Claims, 7 Drawing Figs.
[52] U.S. Cl. ................................................ 198/204
[51] Int. Cl. .................................................. B65g 15/60
[50] Field of Search .......................................... 198/129,
   204, 170, 168

[56] References Cited
   UNITED STATES PATENTS
2,304,603 12/1942 Schroeder .................. 198/168
2,803,334 8/1957 Kitson ........................ 198/204
3,292,772 12/1966 Rice ............................ 198/204
3,367,718 2/1968 Hauschopp .................. 198/204
3,105,586 10/1963 Carew ......................... 198/64

Primary Examiner—Richard E. Aegerter
Attorney—Zarely, McKee & Thomte

ABSTRACT: A material-handling conveyor means for food materials or the like including a horizontally disposed support beam having a first bearing means secured thereto adjacent one end thereof and a second bearing means adjustably movably mounted at the other end thereof. A driven shaft extends through the first bearing means horizontally from the beam and an idler shaft is mounted in the second bearing means and extends horizontally therefrom. The shafts support pulleys which have an endless conveyor belt mounted thereon. The conveyor belt is mounted in a casing which is secured to and supported by the support beam. One side of the casing is closed by a removable cover to facilitate the cleaning of the interior of the casing. A belt-takeup assembly is connected to the second bearing means to permit the idler shaft to be moved with respect to the driven shaft to adjust the tension in the conveyor belt. The takeup assembly includes means to maintain the idler shaft in a parallel relationship to the driven shaft as the tension in the conveyor belt is adjusted.

PATENTED JUN 1 1971

INVENTOR
BERNHARD E. JACOBSON
BY
Zarley, McKee & Thomte
ATTORNEYS

INVENTOR
BERNHARD E. JACOBSON
BY
Zurley, McKee & Thomte
ATTORNEYS 3,581,878

MATERIAL-HANDLING CONVEYOR MEANS

This is a continuation-in-part application of the application, Ser. No. 706,349 filed Feb. 19, 1968.

Conventional material handling elevators and the conveyors which are enclosed rely upon the inherent strength of the casing to support themselves. Thus, if the elevator or conveyor means is constructed of a stainless steel or carbon steel material so as to permit its usage in a food-handling environment, the cost of constructing the elevator or conveyor would be prohibitive due to the fact that the casing of the elevator or conveyor would have to be made strong enough to support the entire weight of the apparatus. Additionally, the conventional elevators and conveyors do not provide a means whereby the interior of the elevators and conveyors can be conveniently cleaned which is necessary in the food industry.

A significant improvement in the art was disclosed in the copending application, Ser No. 706,349 but was primarily directed to a vertically disposed material-handling elevator including a vertically disposed support post having the elevator casing secured at one side thereof. This invention relates primarily to a horizontally disposed conveyor means which is easily cleaned to permit it to conform to food industry specifications. Additionally, the instant invention relates to a takeup assembly connected to the conveyor belt to permit the tension in the belt to be adjusted.

Therefore, it is a principal object of this invention to provide a material-handling conveyor means.

A further object of this invention is to provide a material-handling conveyor means which is horizontally disposed and which is supported by a horizontally disposed support beam.

A further object of this invention is to provide a material-handling conveyor means including a casing which is constructed of stainless steel or carbon steel material.

A further object of this invention is to provide a material-handling conveyor means which includes a casing having one side thereof closeable by a removable cover to facilitate the cleaning of the interior thereof.

A further object of this invention is to provide a material-handling conveyor means having a takeup assembly thereon to adjust the tension in the conveyor belt.

A further object of this invention is to provide a material-handling conveyor means including means thereon to insure that the idler shaft and tail pulley mounted thereon will be maintained in proper alignment with respect to the driven shaft and head pulley mounted thereon.

A still further object of this invention is to provide a material-handling conveyor means which is economical of manufacture, durable in use and refined in appearance.

These and other objects will be apparent to those skilled in he art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
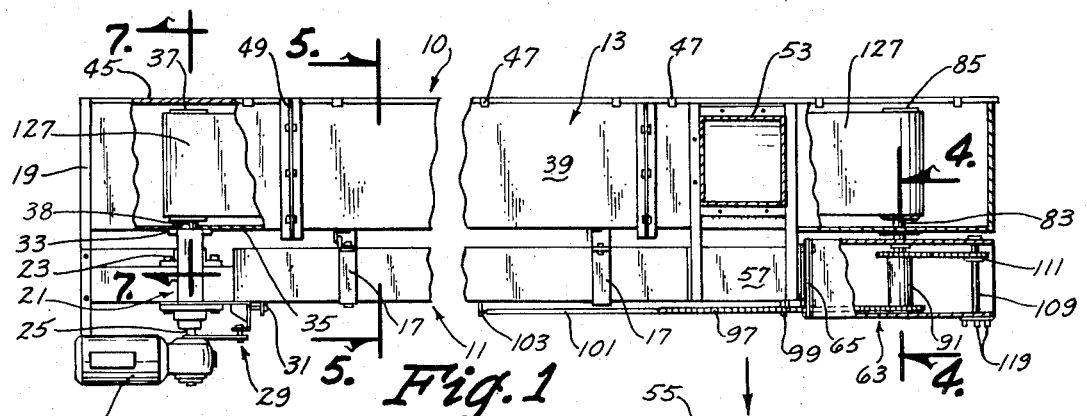
FIG. 1 is a fragmentary top view of the conveyor means with portions thereof cut away to more fully illustrate the invention.

The conveyor of this invention is generally designated by the reference numeral 10 and includes a horizontally disposed support beam 11 and a casing 13 secured thereto at one side thereof. Support beam 11 may be secured to any convenient support frame such as the stand assembly 15 illustrated in FIG. 2. Beam 11 is preferably constructed of a hollow tubular steel material and its specifications would necessarily depend upon the length of the conveyor. As seen in FIG. 1, casing 13 is supported by the beam 11 by a plurality of support assemblies 17 detachably mounted on the beam 11 and beam secured to the casing 13 along the length thereof. A channel means 19 is also secured to one end of the casing 13 and extends to the beam 11 where it is also secured to further strengthen the discharge outlet 51.

Figure 2:
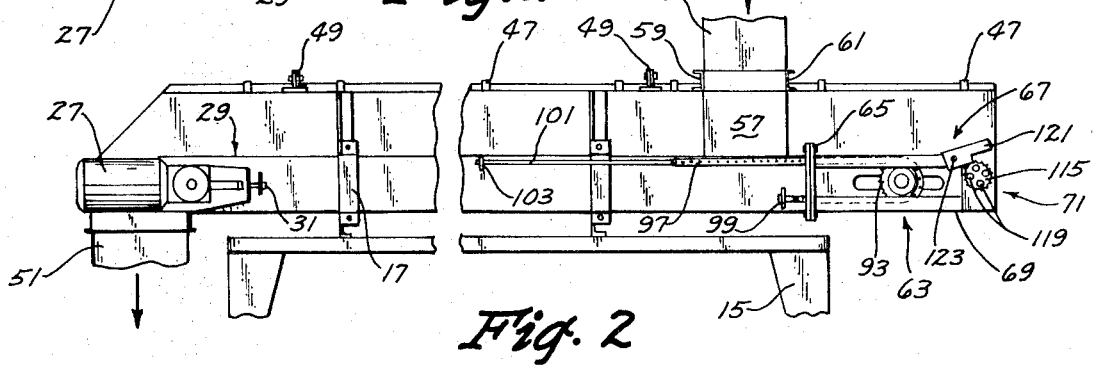
FIG. 2 is a fragmentary side elevational view of the device seen in FIG. 1.
Figure 7:
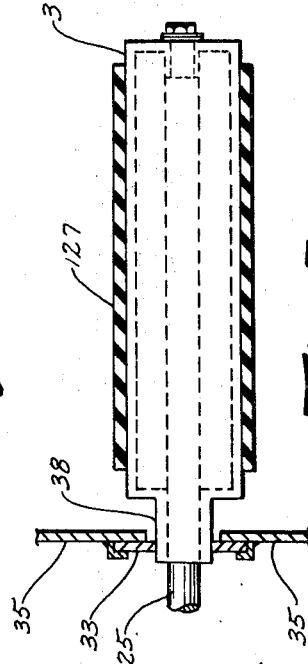
FIG. 7 is an enlarged section view as seen along lines 7-7 of FIG. 1.

A conventional double bearing means 21 of the ball bearing type is secured to the beam 11 adjacent one end thereof (FIG. 1) by any convenient means such as by bolts 23. A driven shaft 25 rotatably extends through the bearing means 21 and has a conventional hollow shaft gearmotor 27 connected to the outer end thereof. The gearmotor 27 is supported by the shaft 25 and has a reaction arm assembly 29 connected thereto including an adjustment bolt assembly 31. Shaft 25 extends through a seal means 33 which is positioned adjacent the outside surface of wall 35 of casing 13 and extends inwardly into the interior of casing 13 as illustrated in FIG. 1. The numeral 37 refers to a head pulley which is removably mounted on the shaft 25 in casing 13 for rotation therewith. Pulley 37 is fully enclosed and completely encloses the portion of shaft 25 that extends into the interior of casing 13. The hub 38 of the pulley 37 extends through wall 35 and seal 33 as seen in FIG. 7. The advantage in the foregoing is that when a stainless steel pulley is specified, the manufacturer will not also be required to provide a stainless steel shaft 25. For purposes of description, casing 13 will be described as including the previously described wall 35, top 39, bottom 41 and open side 43 which is closeable by a removable cover 45 maintained thereon by a plurality of locks 47. As seen in the drawings, the casing 13 is comprised of a plurality of casing sections which are secured in an end-to-end relationship by connecting flanges 49. It is recommended that the internal joints between the casing sections be sealed with pressure-sensitive polyurethene film tape. The fact that the casing 13 is comprised of a plurality of casing sections enables the conveyor to be constructed to any desired length by simply connecting a plurality of the casing sections together through the use of the connecting flanges 49. Casing 13 is provided with a discharge opening 51 provided in bottom 41 at one end thereof and which is in communication with the interior of the casing 13. Casing 13 is also provided with an inlet opening 53 extending into top 39 thereof as illustrated in FIG. 1. FIG. 2 illustrates an inlet flange 55 being mounted on the inlet opening. As seen in FIGS. 1 and 2, a support post 57 is secured to beam 11 at one end thereof and has a pair of support arms 59 and 61 secured thereto and extending laterally therefrom on opposite sides of the inlet opening 53. Support arms 59 and 61 are secured to the casing 13 to provide additional support to the inlet opening flange 55.

The numeral 63 generally designates a housing having an end wall 65 secured to one end of the beam 11 by bolts or the like. Housing 63 also includes a top 67, bottom 69 and end portion 71.

Figure 3:
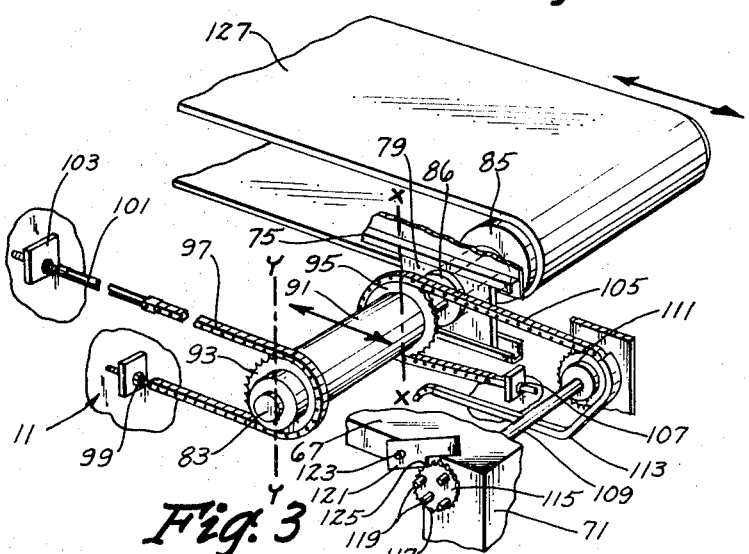
FIG. 3 is a perspective view of the takeup assembly of the conveyor means.
Figure 4:
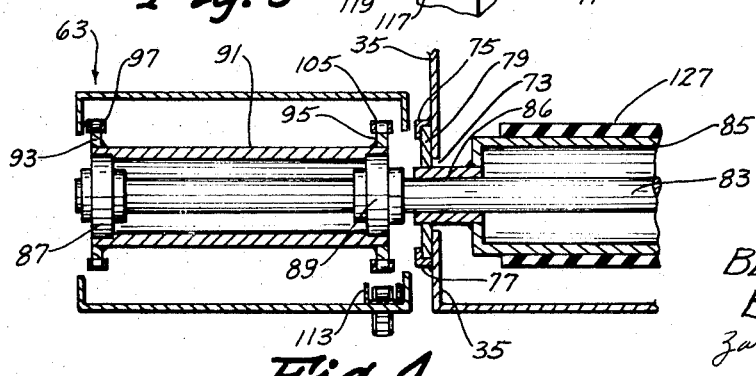
FIG. 4 is an enlarged sectional view as would be seen along lines 4-4 of FIG. 1.
Figure 6:
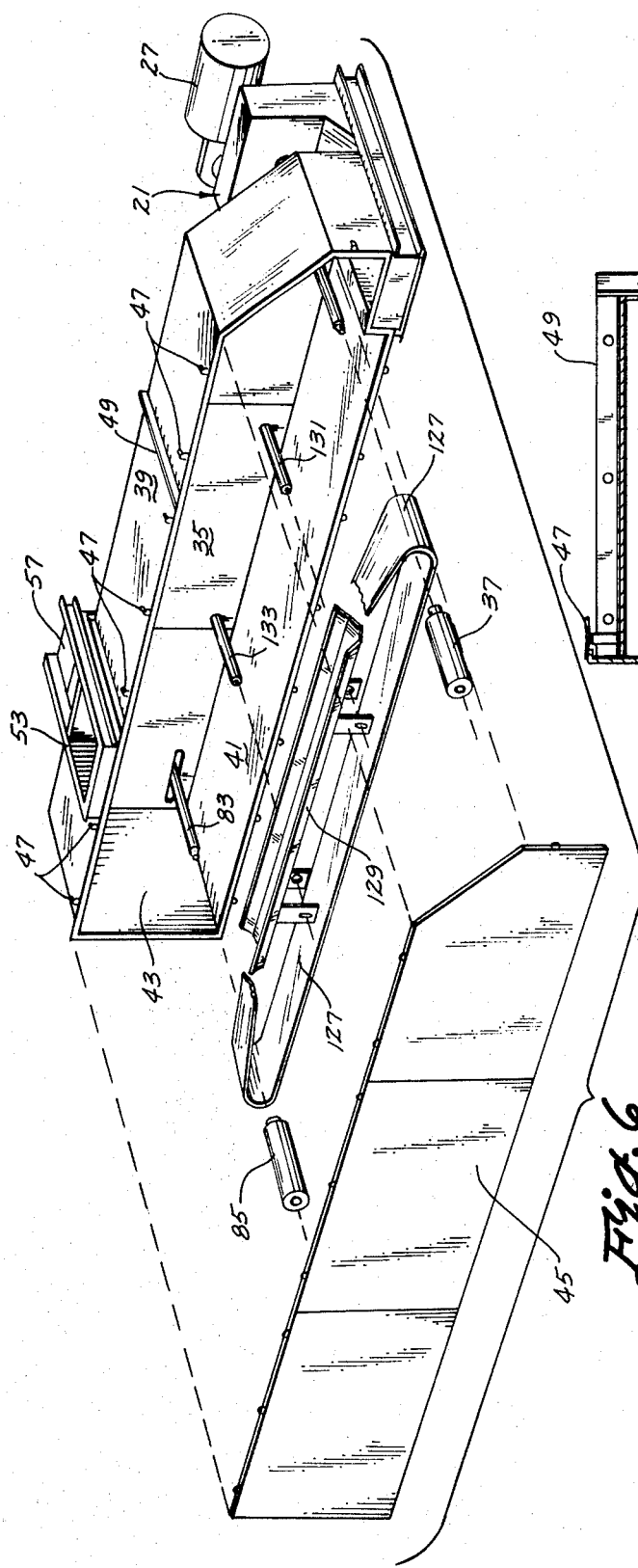
FIG. 6 is an exploded perspective view of the conveyor means illustrating the relationship of the removable cover to the casing.
Figure 5:
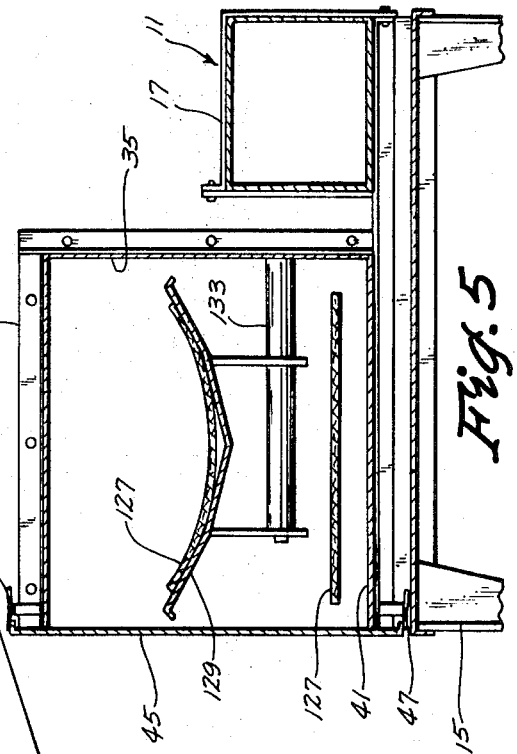
FIG. 5 is an enlarged sectional view as seen along lines 5-5

Wall 35 of casing 13 is provided with an opening 73 formed therein. As seen in FIGS. 3 and 4, a pair of spaced-apart guide channels 75 and 77 are secured to the exterior surface of wall 35 by welding or the like at a point above and below the slot opening 73 respectively. A seal plate 79 is horizontally slidably received between the guide channels 75 and 77. The numeral 83 refers to a tail shaft which extends into the casing 13 and into the interior of housing 63. A fully enclosed tail pulley 85 is mounted on shaft 83 in casing 13 and completely encloses that portion of the shaft 83 that protrudes into the interior of casing 13. The hub 86 of the pulley 85 extends through wall 35 and seal 79 as seen in FIG. 4 for the reasons set forth in the description of pulley 37, wall 35 and seal 33 (FIG. 7). A pair of bearing means 87 and 89 are mounted on the shaft 83 in a spaced-apart relationship as illustrated in FIG. 4 and have a bearing housing 91 mounted thereon and extending therebetween as illustrated in FIG. 4. Sprocket 93 is mounted on one end of housing 91 by welding or the like while sprocket 95 is mounted on the other end of housing 91 by welding or the like. Bearings 87 and 89 permit the shaft 83 to rotate with respect to the housing 91 and also permit the housing 91 to be rotated with respect to the shaft 83.

A chain 97 extends around sprocket 93 and has one end secured to an adjustment bolt assembly 99 which is secured to beam 11. A resilient means 101 is connected at one end to the other end of chain 97 and is connected at its other end to an adustment bolt assembly 103 which is secured to beam 11. Resilient means 101 may be comprised of an elongated rubber cord, spring, etc. and is designed to keep the upper portion of the chain 97 from drooping downwardly into the path of sprocket 93. A chain 105 extends around sprocket 95 as viewed in FIG. 3 and has one end secured to an adjustment bolt assembly 107 which is secured to the housing 63 by any convenient means such as welding or the like as illustrated in FIG. 3. Shaft 109 is rotatably mounted in housing 63 in a parallel relationship to shaft 83 and has a sprocket 111 mounted thereon for rotation therewith in an aligned condition with sprocket 95. Chain 105 extends around sprocket 111 as illustrated in FIG. 3 and extends downwardly through a guide tube 113. Chain 105 extends downwardly through the lower end of the guide tube 113 and has its free end normally exposed therefrom. Sprocket 115 is mounted on the outer end of shaft 109 and has a plurality of teeth 117 extending therefrom. Sprocket 115 is also provided with a plurality of lugs 119 which extend outwardly therefrom. A ratchet lever 121 is pivotally connected to the housing 63 at 123 and has a shoulder 125 adapted to engage the teeth 117 to prevent counterclockwise rotation of the sprocket and shaft 109.

A conveyor belt 127 is mounted on and extends between the pulleys 37 and 85 and is preferably of two-ply food quality type. The numeral 129 designates a belt trough provided in the interior of casing 13 and removably mounted on a pair of posts 131 and 133 which facilitate the easy removal of the trough 129 from the interior of casing 13 to permit the apparatus to be cleaned. It is recommended that the trough 129 be constructed of a 16-ga. stainless steel material. The belt 127 runs or follows the trough 129 and aids in maintaining the material on the belt within the casing 13. On longer conveyors, the lower strand of belt 127 may be supported by suitable rollers removably suspended from posts 131 and 133 to prevent it from dragging on the bottom of the casing.

The energization of the gearmotor 27 causes the rotation of pulley 37 which in turn causes the movement of the conveyor belt 127 so that material deposited in the intake opening 53 will be moved along the belt and discharged from the casing through discharge opening 51. Since the apparatus derives its strength from the beam 11, the casing 13 can be constructed of a lighter stainless steel or carbon steel material than would otherwise be possible. Since it is possible to use a lighter gauge material for the casing 13, the apparatus may be more economically manufactured than would be possible with conventional conveyor means. The interior of the casing 13 is easily cleaned by simply removing the cover 45 therefrom which completely exposes one side of the casing. It is possible to properly clean the interior of the casing 13 by simply removing the belt 127, trough 129 and pulleys 37 and 85. The removal of these components makes it possible to efficiently steam the interior of the casing which will be extremely important when the apparatus is being used to convey food materials or the lie. The tension in conveyor belt 127 may be easily increased by simply placing a suitable bar or the like between the lugs 119 and causing sprocket 115 to be rotated in a clockwise direction as viewed in FIGS. 2 and 3. The rotation of the sprocket 115 in a clockwise direction causes shaft 109 and sprocket 111 to be rotated in clockwise directions as viewed in FIG. 3. The rotation of sprocket 111 in a clockwise direction causes the upper part of the chain 105 to be moved towards the sprocket 111 and moved over and downwardly thereover which causes the shaft 83 to be moved towards the shaft 109 to increase the tension in the belt 127. Shaft 83 is permitted the longitudinal movement described above since plate 79 is slidably mounted in the channels 75 and 77. The pull of the belt 127 is resisted by both the upper and lower strands of chain 105 since it is anchored at 107 and held by sprocket 111 (which is kept from turning by shafts 109 and 121, sprocket 115 and ratchet lever 121). So far, it can be seen that the center line X-X of sprocket 95 cannot move in the direction of the belt pull but that centerline Y-Y of sprocket 93 could move to the right except for the restraining action of the lower strand of chain 97 which is anchored at 99. Inasmuch as sprocket 93 cannot rotate relative to sprocket 95, it is the lower strand of chain 97 which takes the brunt of the pull so that center line Y-Y cannot move toward the right. When sprocket 111 is turned clockwise to effect a tensioning force on the belt 127, the upper strand of chain 105 causes sprocket 95 to also turn clockwise and crawl to the right. Sprocket 93 is allowed to move to the right exactly the same amount since they are of equal size so that the angular alignment of shaft 83 is maintained throughout its allowable travel.

The screw adjustment at 90 permits the angular alignment of shaft 83 and pulley 85 to be adjusted as necessary to initially align the belt 127 so it will run in the center of the pulley 85 throughout its range of travel The purpose of the adjustment bolt assembly 31 is to provide an angular adjustment of the shaft 25 and pulley 37 so that belt will run in the center of the pulley 37. Sprocket 115 is prevented from undesirable counterclockwise rotation by the ratchet lever 121. The tension in belt 127 may be easily reduced by simply pivoting ratchet lever 121 upwardly out of engagement with the teeth 117 which will permit the shaft 109 and sprocket 111 to rotate in counterclockwise directions. Tension member 101 keeps chain 97 taut so it cannot fall into the path of sprocket 93 during this operation.

Thus it can be seen that a unique conveyor means has been provided which achieves great structural strength through a horizontally disposed support beam. A conveyor means has been disclosed which permits a conveyor to be economically manufactured for use in the food industry and which may be efficiently cleaned. The takeup assembly on the shaft 83 permits the tension in the conveyor belt 127 to be easily adjusted while maintaining the head and tail pulleys in proper alignment. Therefore, it can be seen that the apparatus accomplishes at least all of its stated objectives.

Some changes may be made in the construction and arrangement of my material-handling conveyor means without departing from the real spirit and purpose of my invention, and it is my intention to cover by my claims, any modified forms of structure or use of mechanical equivalents which may be reasonably included within their scope.

I claim:

1. A material-handling conveyor means, comprising, a support beam having opposite ends and sides,
   a conveyor casing operatively secured to said beam at one side thereof and having a top, a bottom and opposite sides, said casing having an intake opening formed in its top adjacent one end thereof and a discharge opening formed therein in its bottom adjacent its other end,
   a conveyor means in said casing, and
   a power means driving aid conveyor means,
   a first bearing means secured to said beam at one end thereof, a first shaft means mounted in said first bearing means and being connected at one end to said power means, said first shaft means extending transversely from said beam into said casing, a first pulley mounted on said first shaft means in said casing, a second bearing means operatively secured to said beam at the other end thereof and having a second shaft means mounted therein extending transversely from said beam into said casing, a second pulley on said second shaft in said casing, a conveyor belt mounted on said first and second pulleys and extending therebetween, and a takeup assembly connected to said second shaft means for moving said second shaft means and said second pulley towards and away from said first shaft and first pulley, said takeup assembly including means to maintain said second shaft means parallel to said first shaft means.

2. The conveyor means of claim 1 wherein said second shaft means slidably and rotatably extends through one side of said casing, said second shaft means having a first shaft portion in said casing and a second shaft portion outside of said casing, a housing rotatably mounted on said second shaft portion and having first and second spaced-apart sprockets rigidly secured thereto, a third shaft means operatively secured to said beam outwardly of said second shaft portion and parallel thereto, a third sprocket means on said third shaft means in alignment with said first sprocket, a first chain means having one end operatively anchored to said beam between said first and third sprockets; said first chain extending first around and over said first sprocket and thence over and around said third sprocket, the rotation of said third shaft in one direction causing said first chain means to rotate said housing about said second shaft portion and to slidably move said second shaft means away from said first shaft means, and a second chain means having one end operatively anchored to said beam between said first and second shaft means and extending first beneath and around said second sprocket means and thence extending towards said one end of said beam.

3. The conveyor means of claim 2 wherein said third shaft means has a ratchet means secured thereto for selectively preventing rotation of said third shaft means in a direction opposite to said one direction.

4. The conveyor means of claim 3 wherein said third shaft means has an outwardly extending lug means operatively connected thereto adjacent said ratchet means for rotating said third shaft means in said one direction.

5. The conveyor means of claim 2 wherein said one end of said second chain means is adjustably anchored to permit the angular adjustment of said second shaft means with respect to said conveyor means.

6. A material-handling conveyor means, comprising, a horizontally disposed support beam having opposite ends and sides, a plurality of spaced-apart support assemblies secured to said beam along the length thereof and extending outwardly therefrom, a conveyor casing secured to and supported by said support assemblies, said casing being horizontally spaced from said beam at one side thereof, said casing having an intake opening formed at one end thereof and a discharge opening formed at its other end, a conveyor means in said casing, and a power means driving said conveyor means, said casing having one side thereof closed by a removable cover means, said conveyor means including at least a driven shaft extending into said casing adjacent one end thereof and an idler shaft extending into said casing adjacent the other end thereof, said driven and idler shafts having pulleys mounted thereon, said conveyor means including a conveyor belt extending around and between said pulleys, said conveyor belt and pulleys being removable from the interior of said casing through said one side thereof when said cover means has been removed to permit the cleaning of said conveyor belt and pulleys and to permit the cleaning of the interior of said casing, at least a pair of posts being positioned in said casing between said driven and idler shafts, a belt guide trough detachably mounted on said posts adapted to support the conveyor belt thereon, said guide trough also being removable from the interior of said casing through said one side when said cover means has been removed.